United States Patent [19]
Phillips

[11] 3,765,373
[45] Oct. 16, 1973

[54] MILKING MACHINES

[76] Inventor: Francis Mark Phillips, Gembrook Rd., Nar Nar Goon, Victoria, Australia

[22] Filed: Jan. 25, 1972

[21] Appl. No.: 220,625

[52] U.S. Cl. .............................................. 119/14.04
[51] Int. Cl. ............................................... A01j 5/00
[58] Field of Search ................................... 119/14.04

[56]  References Cited
UNITED STATES PATENTS

| | | | |
|---|---|---|---|
| 3,095,854 | 7/1963 | Bott et al. | 119/14.04 |
| 3,116,713 | 1/1964 | Darling | 119/14.04 |
| 3,460,515 | 8/1969 | Page et al. | 119/14.04 |
| 2,305,259 | 12/1942 | Jeffers, Sr. | 119/14.04 |
| 2,316,065 | 4/1943 | Hapgood | 119/14.04 |

Primary Examiner—Louis G. Mancene
Assistant Examiner—J. N. Eskovitz
Attorney—E. F. Wenderoth et al.

[57] ABSTRACT

A milking machine installation having a rotatable annular raised platform for carrying a number of cows with provision for feeding the cows while they are being milked by a milking machine mounted on the inside of the platform controlled by an operative positioned in the center of the installation, the cows remaining on the platform between a boarding position and an alighting position which takes them for substantially a full turn of the platform.

2 Claims, 3 Drawing Figures

PATENTED OCT 16 1973

MILKING MACHINES

This invention relates to a milking machine installation.

Improvements in milking machine installations are generally directed toward more efficient machinery for the removal of milk and improved bulk milk handling methods. However comparatively little has been done in the improvement of animal handling to shorten the bailing time for each cow. It has been found that the actual milking time of each cow is comparatively short being only between 3 to 5 minutes but that the cow may be bailed for up to 10 minutes during which time the usual manual requirements of ushering, bailing and feeding takes place apart from the actual milking operation.

Under present conditions of milking, two skilled men can at best milk at the rate of 45 cows per hour and therefore with an average size herd of 90 milkers, the time spent in the milking shed is at least 4 hours in every day.

Accordingly in the quest for more efficient dairying procedures it is clear that the milking rate should be greatly improved in order to do away with the need to hire skilled labor on an average size farm and also to free the farmer for other important duties around the farm.

The invention accordingly has for its principal object the provision of means for the simultaneous expeditious milking of a multiple number of cows under the controlling supervision of one only skilled operative without the necessity for employing the conventional row of individual bails and the attendant area required in the cow shed.

It is a further object of the invention to provide a milking machine plant or installation in which the milking operation of a number of cows can be conveniently supervised by a single milker with greatly reduced milking time and consequent economy in this phase of milk production.

It is a further object of the invention to provide such a milking machine or installation in which a predetermined number of cows can be progressively conveniently assembled for milking and dispersed after the milking operation, within a confined space and over a period of time sufficient to permit the complete milking operation of each and every cow. Thus the milking machine plant or installation comprehends a minimum of manual attention, handling and shepherding of the cows with consequent relaxation of the animals for obtaining effective milk release.

With the above stated principal object in view there is provided according to this invention a milking machine installation comprising a horizontal annular platform arranged to be mounted above ground level for rotation at a predetermined speed about a fixed axis, a race through which cows are directed to a platform boarding position when in use, feed means operable in response to the rotating platform for dispensing measured amounts of feed to feed bins each arranged on an outer part of the platform to allow one of each of a row of cows to feed at one of said bins whilst being moved to an alighting position, a milking machine carried upon the platform to rotate therewith having teat cups and claw assemblies for each cow to be individually coupled and uncoupled to and from a cow to be milked, the milking operation being performed between the boarding position and the alighting position, the arrangement being such that an operator tending the cows works inside the row of cows, and the annulus of the platform is of such width and the feed bins are positioned at regular intervals around the platform, to ensure neighborly contact so that undue movement of cows while on the platform is restricted.

Conveniently angular relation of the cows on the platform is such that the shoulder and hip of one cow contacts the hip and shoulder respectively of its two neighbors whereby free movement during the milking operation is restricted. The platform may constitute a flat annular turntable.

In the use of a platform, the cows are herded into a yard and individually directed into the race towards the boarding position relatively to the platform to step onto the latter, the speed of which is such as to ensure that each cow is effectively milked to permit the operative to remove the teat cups from the cows in succession before they reach the alighting position. The speed of rotation of the platform will be discussed in greater detail later. At the boarding position for the cows means such as spring influenced gates, direct the cows into the defined path of movement onto the platform to ensure continuity of movement of the successive cows as they move onto the platform. The cows are restricted in forward movement on the platform and cannot move past a given food bin. The platform moves within a closed annular ring which is open only at the boarding and alighting positions. As previously mentioned the boarding race may be controlled by a gate, however, the alighting race is simply left open so that when a cow arrives there it simply turns and alights from the platform. However, it has been found that there is adequate time for washing and inspection of each cow by the operative in addition to coupling and uncoupling of the teat cups. At each of the abovementioned positions, means may be timed to operate and be so located as to effect an udder wash to each cow before and after the milking operation. Thus the operator has only to couple and uncouple the teat cups from each cow as it boards and is preparing to leave the platform. However, it has been found that there is adequate time for washing and inspection of each cow by the operative in addition to coupling and uncoupling of the teat cups. The teat cup assemblies are suitably mounted on the platform to move with the cows and provide a milk flow to the conventional milk line and releaser of the milking machine or machines.

The milk lines terminate at a large collection vessel also mounted on the platform which vessel incorporates a float switch to energise a pump for removal of the milk to a refrigerated vat of standard construction against the vacuum of the milking machine created by the vacuum pump in standard manner. The pipe connection to the vat incorporates a rotary pipe joint seal. The joint is situated on the axis of rotation of the platform and the axis of the pipe ends making the joint are coaxial with said axis of rotation. The seal is made by a socket joint incorporating O rings.

There is also provided according to the invention a method of operating a milking machine installation as described herein in which the milking operation of a series of cows is carried out on a continuous basis whereby the platform continuously rotate such that a position vacated by an alighting milked cow is immediately filled by a boarding cow to be milked whilst the corresponding empty feed bin is refilled.

In order that the invention will be more easily understood a practical arrangement will now be described having reference to the accompanying drawings in which.

Figure 1:
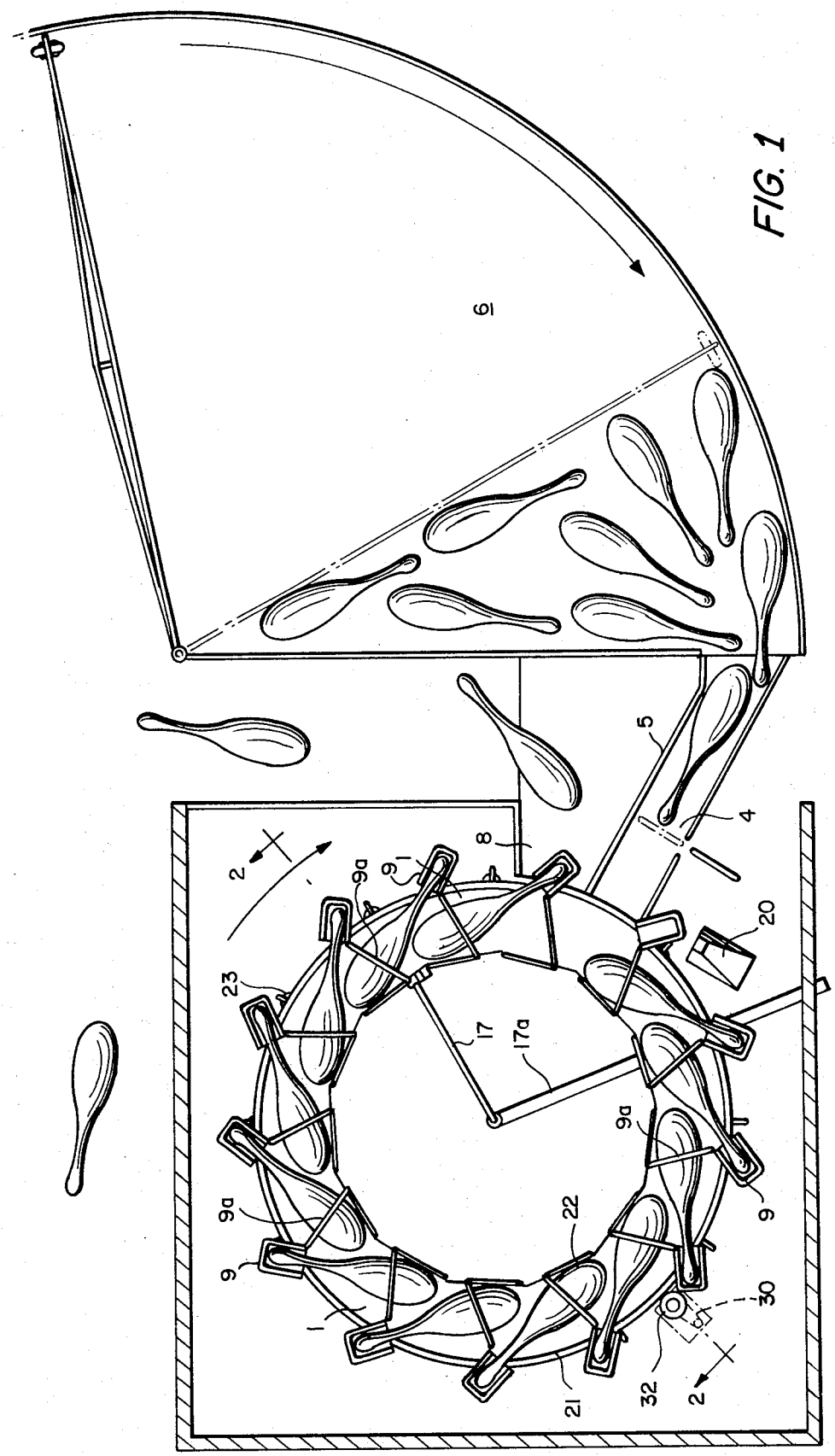
FIG. 1 is a plan view of a general assembly of a dairy incorporating a rotary milking machine.

The platform 1 is a flat annular disc being provided on the underside with several tracking wheels 2 running on a circular rail 3. Alternatively the rail may be secured underneath the platform to run on rollers (not shown). The platform is disposed immediately above ground level so that the cow may conveniently step onto the same after walking up a slight inclined ramp 4, and appropriate rungs or other surfaces are provided to ensure the safe footing of the animal.

At spaced circumferential positions relatively close to each other, there are a pair of races one of which constitutes an inlet race 5 leading from an assembly cow yard 6 from which the cows are individually and successively moved through the associated race to step onto the platform. The other race is an alighting race 8 disposed adjacent to the upstream of the inlet race 5. The inlet race 5 may include a gate which opens periodically in response to movement of the platform and is biased to close after a cow has boarded and moved into its alloted space.

There are two concentric barrier rails 21, 22 marginally disposed about the periphery of the platform to provide a milking space in which each cow stands and feeds from a feed bin 9 a plurality of which are supported and selectively positioned around the platform on bars 9a. Means may be provided such as a gate or a chain (not shown) to place behind the cow to maintain its position. With selective positioning of the feed bins it is possible to maintain a shoulder and hip engagement between successive cows on the platform so that the cows are in a semi-herring bone formation and thus restrict free movement on the platform while milking. The platform is maintained centrally upon the tracking rails 3 by idler wheels 23 disposed about the circumference of the platform.

There is effectively supported upon the platform a milking machine plant including a circular milk line 10 and vacuum line 10a to which is connected a number of milk lines emanating in normal manner each of which connect to the milk line through a flow indicator 11 from claw and teat cup assemblies mounted upon the platform to rotate therewith. The main milk line 10 ends at a milk tank 12 which is connected to vacuum tank 13 to provide the required milking vacuum. The vacuum pump and motor are shown respectively at 14 and 15. The milk tank 12 includes a simple magnetic limit switch to energise milk pump motor 16 to drive milk out to storage through outlet pipe 17.

The piped connection 17 to the storage vat incorporates a rotary seal 18 whereby rotating pipe 17 can connect to stationary pipe 17a. The rotating axis of the rotary seal is coaxial with the axis of rotation of the platform. Power is supplied to the motors through overhead slip rings (not shown) of known construction.

The arrangement is such that each one of a number of cows at one time, for example 13, are coupled to a teat cup assembly for simultaneous milking, the operation being completed by the time the cow reaches the outgoing race to alight from the platform. The time for actual milking is usually between 3 to 5 minutes and it has been found that with one revolution every 6½ minutes the operator has ample time to wash the teats and apply the teat cup as a cow positions itself on the platform and simply turn to a cow which has finished and remove the teat cups and inspect the teats prior to the cow moving off the platform. It has been shown that with this machine, 120 cows can be milked in an hour with the platform taking 6½ minutes to make one revolution.

Figure 2:
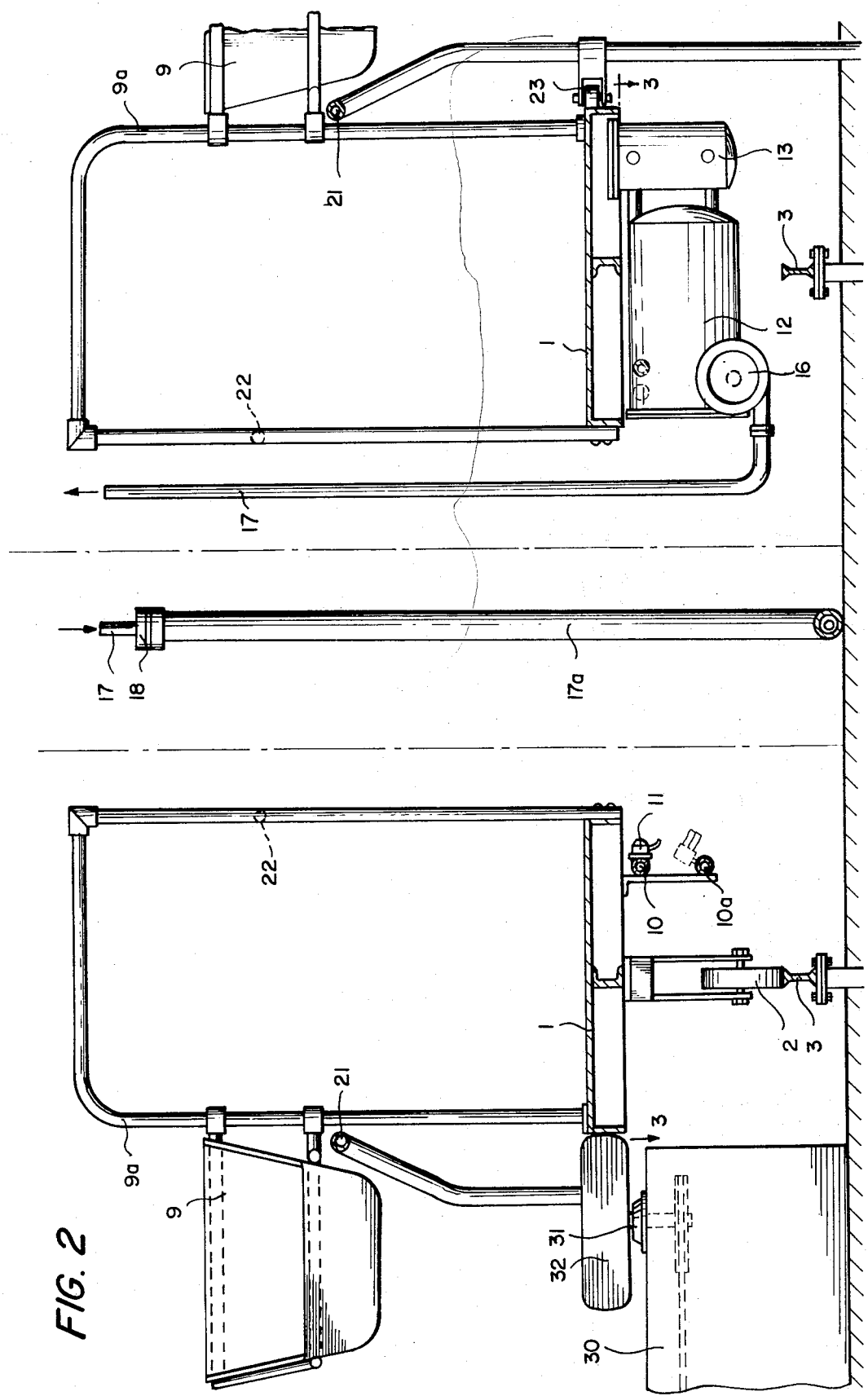
FIG. 2 is a cross-sectional view on line 2—2 of the platform of the rotary milking machine.
Figure 3:
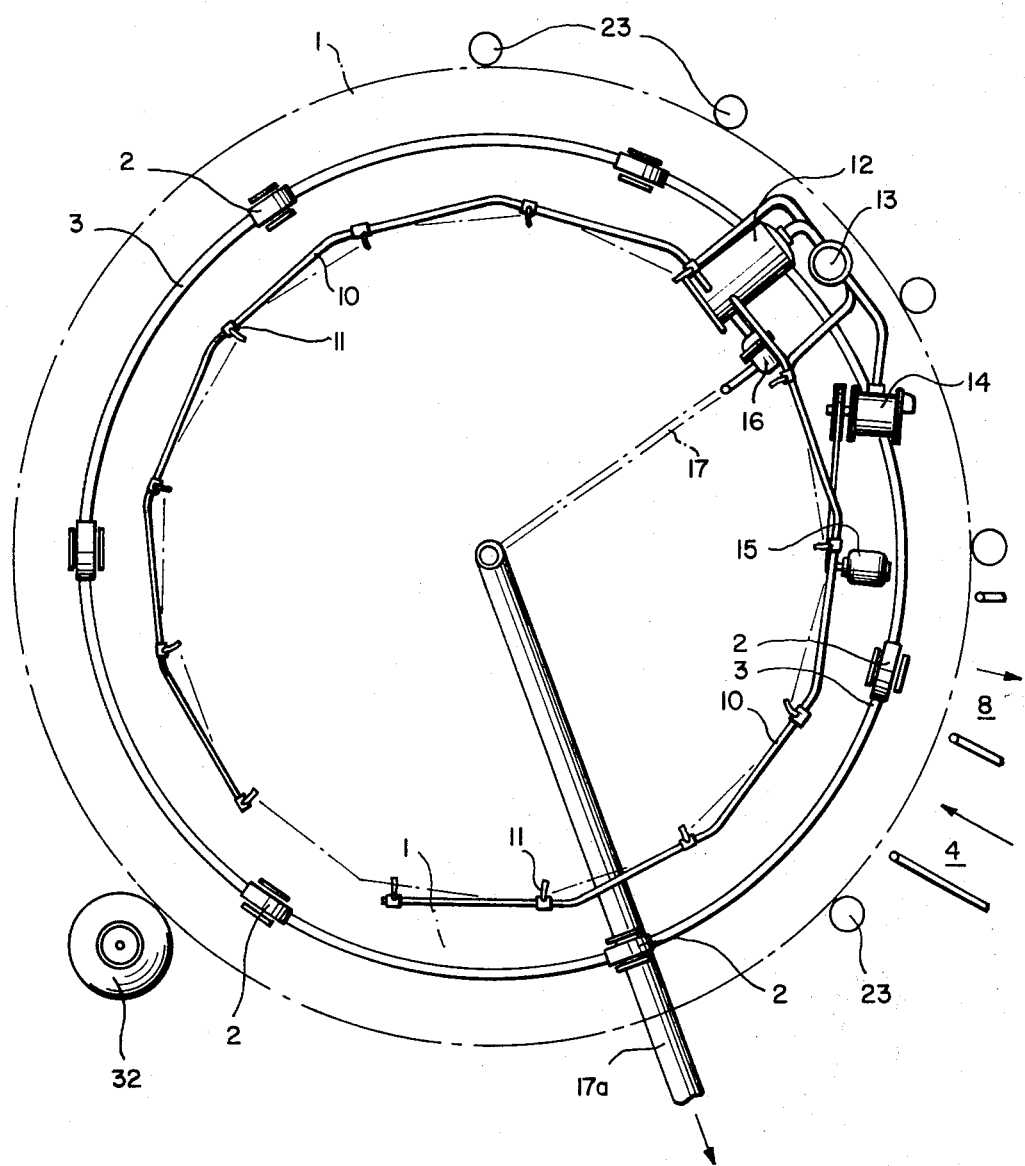
FIG. 3 is a further cross-sectional view taken on line 3—3 of FIG. 2.

One means of driving the platform is shown in FIG. 2 comprising a motor and reduction drive mounted in housing 30, the drive being connected through shaft 31 to a driving wheel 32 frictionally contacting the edge of the annular platform 1 and adapted to rotate the platform at predetermined speed.

The annular construction of the platform enables the operator to move on the ground inside the platform between incoming and outgoing cows at will and very little time is wasted in unnecessary movement of the operator. This is particularly so in view of the adjacency of the incoming and outgoing races whereby the cows requiring the most attention of the operator are relatively close together. The movement of the platform is utilised in affecting automatic dispensing of feed to each feed bin by automatic trip means acting to dispense a measured amount of feed to each feed bin as the platform rotates. This can be carried out in any convenient manner such as by a gravity hopper feed bin 20 having a closure means which can be tripped open momentarily by single trip means on the platform whereby a measured amount of feed is dispensed from this hopper. A timed conveyor system may be used in this arrangement to deliver measured amounts of feed to the hopper. It is easily arranged for a feed bin adjacent the boarding position to be filled as a cow boards the platform.

Provision is also made for yoking of the cows at their respective feed bins if necessary. Automatic yoking can easily be arranged by provision of trips stationed beside the platform just after and just before the boarding and alighting positions respectively. The yoke is pivotable between two positions and the trip mechanism at each station is operable to position the yoke in an operating position around a cow to be milked and the other station to release the yoke from the cow to allow it to alight. The yoke operation can be overridden by the milking operator if necessary.

I claim:

1. A milking machine installation comprising:
   a horizontal annular platform arranged to be mounted above ground level for rotation at a predetermined speed about a fixed axis;
   an inlet race positioned to direct cows onto said platform at a boarding position thereof;
   an outlet race positioned upstream of and adjacent to said inlet race for directing cows from said platform at an alighting position thereof;
   means for positioning said cows on said platform at an angle to tangents thereof, with the heads of said cows directed outwardly of said platform, with the inner shoulder of each cow contacting the outer hip of the next forward cow, and with the outer hip of said each cow contacting the inner shoulder of the next following cow;

feed bins located adjacent the head of each of said cows when positioned on said platform;

feed means operable in response to rotation of said platform for dispensing a predetermined amount of feed into each of said feed bins; and a milking machine carried on said platform to rotate therewith and having teat cups and claw assemblies for each cow to be individually coupled and uncoupled to and from a cow to be milked, said machine including a milk tank connected by a pipe to a storage tank stationary relative to said machine and milk tank, said connecting pipe including a rotary seal connecting rotating and stationary connecting pipe parts, whereby said cows when on said platform face outwardly thereof such that an operator tending the cows works inside the row of cows, said cows being angularly related relative to said annular platform so that the hip and shoulder of one cow is closely adjacent the respective hip and shoulder of its two neighbors to ensure neighborly contact so that undue movement of cows while on said platform is restricted, the milking operation being performed between said boarding position and said alighting position.

2. A method of operating a milking machine insallation including a horizontal annular platform arranged to be mounted above ground level for rotation at a predetermined speed about a fixed axis, a race through which cows are directed to a platform boarding position when in use, feed means operable in response to rotation of the platform for dispensing measured amounts of feed to feed bins each arranged on an outer part at regular intervals around the platform to allow one of each of a row of cows to feed at one of said bins while being moved to an alighting position, a milking machine carried upon the platform to rotate therewith having teat cups and claw assemblies for each cow to be individually coupled and uncoupled to and from a cow to be milked, said machine including a milk tank connected by a pipe to a storage tank stationary relative to said machine and milk tank, said connecting pipe including a rotary seal connecting rotating and stationary connecting pipe parts, said method comprising:

loading said cows one at a time onto said platform at said boarding position;

aligning each cow on said platform in contacting relationship with both the next forward cow and the next following cow, with the head of each cow directed outwardly at an angle to a tangent of said platform, with the inner shoulder of each cow contacting the outer hip of the next forward cow, and with the outer hip of said each cow contacting the inner shoulder of the next following cow;

rotating said cows on said platform at a predetermined speed from said boarding position to said alighting position;

milking each of said cows by means of said milking machine during travel of each of said cows from said boarding position to said alighting position; and directing said cows from said platform at said alighting position.

* * * * *